United States Patent [19]

Ahmad

[11] 4,279,958

[45] Jul. 21, 1981

[54] COMPOSITE FOAM PANEL

[75] Inventor: Abu Ahmad, Newark, Ohio

[73] Assignee: Owens-Corning Fiberglas Corporation, Toledo, Ohio

[21] Appl. No.: 96,958

[22] Filed: Nov. 23, 1979

[51] Int. Cl.³ .......................... B32B 5/20; B32B 7/02; B32B 17/04; B32B 23/02

[52] U.S. Cl. ..................................... 428/215; 156/79; 264/45.3; 428/248; 428/249; 428/251; 428/252; 428/285; 428/286; 428/287; 428/313

[58] Field of Search ............... 428/310, 313, 314, 315, 428/312, 320–322, 245, 246, 252, 285, 286, 287, 213, 214, 215, 251, 248, 249; 264/45.3; 156/78, 79

[56] References Cited

U.S. PATENT DOCUMENTS

| | | |
|---|---|---|
| 3,441,464 | 4/1969 | Blue ................................. 428/317 |
| 3,726,708 | 4/1973 | Weissenfels et al. ................ 428/314 |
| 3,728,182 | 4/1973 | Wisotzky et al. ...................... 428/40 |
| 3,867,494 | 2/1975 | Rood et al. ........................... 428/310 |
| 3,874,980 | 4/1975 | Richards et al. ...................... 428/337 |
| 3,916,060 | 10/1975 | Fish et al. ............................. 428/303 |
| 4,028,158 | 6/1977 | Hipchen et al. ..................... 428/313 |

*Primary Examiner*—William J. Van Balen
*Attorney, Agent, or Firm*—Ronald C. Hudgens; Philip R. Cloutier

[57] ABSTRACT

An improvement in low temperature distortion is realized in a composite panel comprising a cellular core and upper and lower layers of organic fibers on each of the major surfaces of the core, the panel having upper and lower outer glass layers in contact with the upper and lower layers of organic fiber, the improvement comprising a layer of inorganic fibers interposed between the cellular core and the upper layer of organic fibers.

10 Claims, 4 Drawing Figures

COMPOSITE FOAM PANEL

BACKGROUND OF THE INVENTION

This invention relates to a composite foam panel comprising an organic foam core with layers of organic and inorganic fibers on opposite major surfaces thereof.

In one of its more specific aspects, this invention relates to a foam panel usable as a roofing component.

The use of composite panels having an organic foam core with inorganic fibers on both major surfaces is well known. U.S. Pat. No. 3,874,980 to Richards et al discloses such a panel which has excellent structural integrity. To a great degree, this integrity is attained by placing the inorganic fibrous layers in contact with the foam which forms the core. This contact is established by foaming the core such that the foam tends to penetrate the interstices in the fibrous layers, but only sufficiently to provide adherence between the layers; that is, the foam remains as a discrete layer except at the interlocking interfaces between it and the other layers.

A second, well known composite panel is that described in U.S. Pat. No. 4,028,158 to Hipchen et al. This composite comprises a facing sheet, a mat of glass fibers and a foam. During the formation of the composite, the facing sheets, having the mat and the foam-forming mixture therebetween, are passed through nip rolls. The pressure of the nip rolls destroys the discreteness of the foam such that the composite, upon expansion after the nip roll compression, exists with its interstices at least partially filled with foam.

STATEMENT OF THE INVENTION

There now has been discovered a composite foam panel having an improved resistance to low temperature deformation and one which is particularly suitable as insulation board or for use in built-up roofing. According to this invention, there is provided a composite comprising a foam positioned on a first layer of organic material interposed between the foam and a core board. A layer of reinforcing glass mat is positioned in contact with the opposite surface of the foam and a second layer of organic material is positioned on the reinforcing glass mat. A surface glass mat is then superimposed on the upper surface of the second layer of organic material.

This invention, then, comprises an improvement in a composite panel comprising a cellular core and upper and lower layers of organic fibers on each of the major surfaces of the core, the panel having upper and lower outer glass layers in contact with the upper and lower layers of organic fibers. The improvement comprises a layer of inorganic fibers interposed between the cellular core and the upper layer of organic fibers.

DESCRIPTION OF THE DRAWINGS

Referring to FIG. 1, there is shown an embodiment of the prior art composite described in the aforementioned U.S. Pat. No. 3,874,980.

Figure 1:
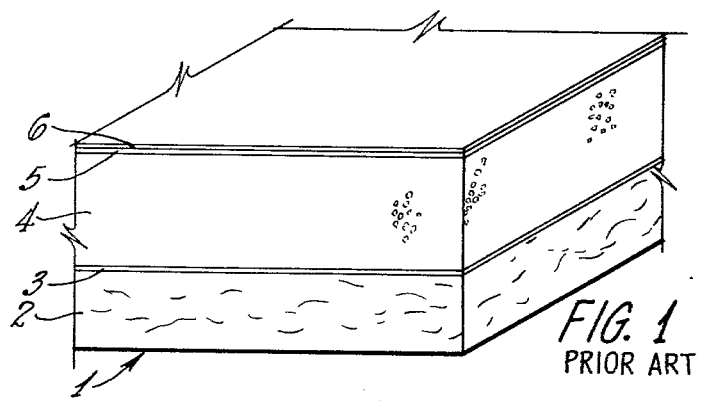
FIG. 1 depicts a composite of the prior art.

In the composite 1, an organic layer 3 is superimposed on core board 2. Superimposed on the organic layer is a layer 4 of foam on which is superimposed a second organic layer 5. The uppermost layer superimposed on the second organic layer is an inorganic mat 6.

Figure 2:
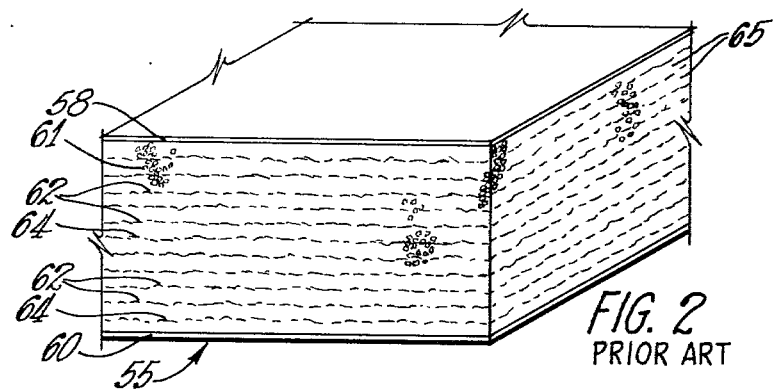
FIG. 2 depicts a composite of the prior art.

With reference to prior art FIG. 2, there is shown the prior art composite as described in the aforementioned U.S. Pat. No. 4,028,158. In this figure, the structural laminant 55 comprises two facing sheets, 58 and 60, and a rigid foam 61 therebetween. Distributed substantially evenly throughout the foam are a multitude of glass fibers 62 arranged in layers 64, which are substantially parallel to the facing sheets. The foam completely fills the interstices 65 between the glass fibers.

Figure 3:
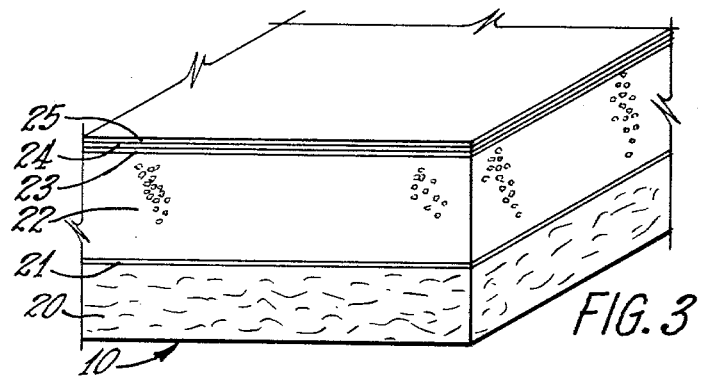
FIG. 3 depicts the composite of the present invention; and,
FIG. 4 is an elevational schematic view of equipment for carrying out the invention.

Referring to FIG. 3, there is depicted the composite of this invention. Composite 10 is comprised of bottom core board 20 of inorganic fibers, preferably glass with a layer of organic fibers 21 superimposed thereon. Positioned on the organic fibers and penetrating the organic fibers only to an extent sufficient to provide adherence with the core board and the organic fibers is a cellular layer 22. Positioned on the cellular layer is a layer of reinforcing inorganic fibers 23 and an uppermost layer of organic fibers 24 positioned thereupon. On this layer of organic fibers is a surface layer 25 of inorganic fibers. The foam penetrates the layer of reinforcing inorganic fibers, the uppermost layer of organic fibers and the surface layer of inorganic fibers only to the extent of providing suitable adherence thereof to the foam and to form a composite of all layers involved.

The bottom core board of inorganic fibers can be comprised of any suitable fibrous material having a thickness of about $\frac{1}{2}$ to about $2\frac{1}{2}$ inches and an apparent density of about 6 to 12 pounds per cubic foot, preferably about 9 pcf. In the preferred embodiment, the bottom core board will consist of glass fibers having diameters within the range of about 0.00050 to about 0.00055 inch, although the fibers can be as fine as 0.00010 inch. The fibers can be held together by any suitable binder, preferably a thermosetting binder. The board should be of sufficient density to resist any substantial penetration of the foam other than that enabling adherence with the various elements as a composite.

The cellular core can be formed of any suitable hardenable cellular material formed by foaming. Preferably, it will be an organic foam of the urethane type. It can be of any desired thickness and preferably will be within the range of $\frac{1}{2}$ inch to 4 inches, with a thickness of $1\frac{3}{4}$ inches being preferred.

The core will have a density within the range of from about 1.4 to about 2.6 pcf, with about 1.8 to about 2.2 pcf being preferred.

Examples of other suitable cellular materials include Styrofoam, epoxies, phenolics, isocyanurates, polyvinyl chlorides and mixtures thereof.

Any suitable organic fibrous layer can be employed as either of the two organic fibrous layers of the composite. Suitable are woven or non-woven webs of nylon, cellulose or rayon, and their mixtures. One preferred organic layer is Scott's Paper's No. 6135, a non-woven rayon web having a thickness of about $6\frac{1}{2}$ mils and an elongation of about 40% in the cross-machine direction and about 12% in the machine direction. This layer can have a thickness within the range of from about 5 to about 7 mils, with about $6\frac{1}{2}$ mils being preferred. Its density will preferably be about 0.675 ounces per square yard. Preferably, it will be coated with a surfactant which allows sufficient foam penetration therethrough.

The reinforcing mat interposed between the foam and the top organic layer will preferably be a loosely bonded glass mat having a thickness within the range of from about 10 to about 30 mils, 10 mils being preferred. The mat will have a density of between about 3.7 and 9.7 grams per square foot. The use of polyester binder on the mat is preferred.

A suitable mat of this description is Surmat 200 available from Nicrofibers, Inc.

The uppermost, or surface, mat will preferably be glass and will have a thickness within the range of from about 10 to about 14 mils, preferably about 12 mils. It will have a density of about 0.0113 pounds per square foot and preferably have a binder comprising polyvinyl alcohol or polyvinyl alcohol and polystyrene. A suitable surface glass mat is a 12 mil surface glass mat from Crane and Co.

Figure 4:
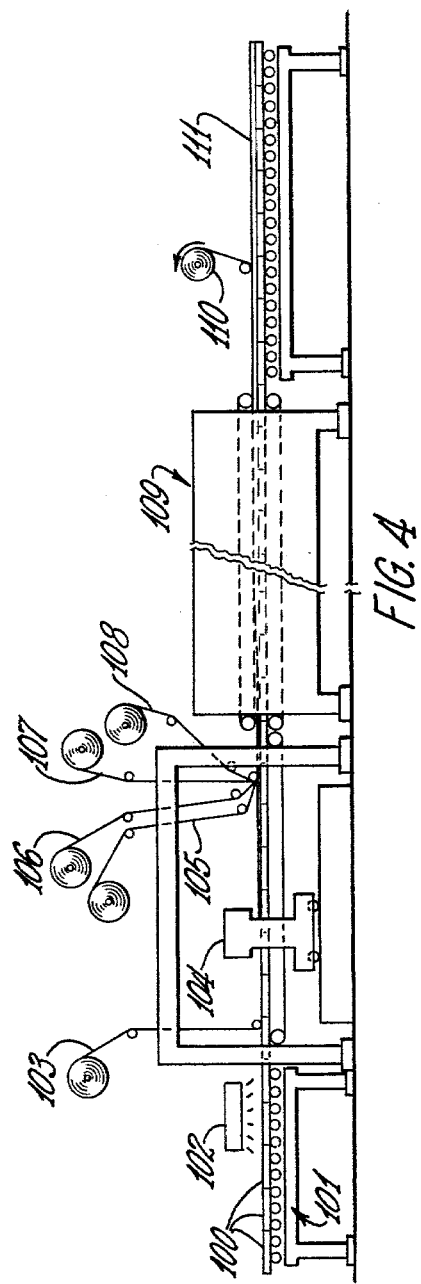

Referring now to FIG. 4, core board 101 is fed onto conveyor 102 and fed through core board heater 103 where the board is heated to a preliminary temperature of about 40 to 200° C. Onto the heated board is then fed the lower organic layer 104. The composite is next directed under a mixing head 105 which is regulated to discharge a pre-controlled amount of foamable mixture onto the board.

Onto the foamable mixture is then fed, in order, the reinforcing mat 106, the top organnic layer 107 and the uppermost mat 108. Finally, on top of the surface glass mat is positioned a polymeric film 109.

The composite is then conveyed through heated laminator 110 which heats the composite to the temperature at which the desired foaming takes place and which limits the extent to which the foamed composite increases in size.

The polymeric film is recovered at location 111 and the composite 112 is routed to other operations, such as trimming and the like, necessary for the production of a commercial product.

As mentioned, the product of this invention differs from prior art products in several ways, one of which is the inclusion of the reinforcing mat between the upper organic layer and the foam. This inclusion has resulted in unexpected improved properties in respect to the resistance of the composite to cold temperature deformation, as indicted by the following.

Several composites, one with and two without the presence of the reinforcing mat, but otherwise identical, were manufactured and then cured for five days. Each was then subjected to a temperature of −6.7° C. for two hours and the degree of warpage, or cupping, was measured. Results were as follows:

| Thickness, Inches | | | Reinforcing | Distor- | Heat Transfer |
| Composite | Lower Outer Glass Layer | Foam | Mat Present | tion, Inches | Coefficient C |
|---|---|---|---|---|---|
| 2⅝ | 11/16 | 1.941 | No | 0.30 | 0.055 |
| 2⅝ | 11/16 | 1.941 | Yes, 10 | 0.17 | 0.054 |

-continued

| Thickness, Inches | | | Reinforcing | Distor- | Heat Transfer |
| Composite | Lower Outer Glass Layer | Foam | Mat Present | tion, Inches | Coefficient C |
|---|---|---|---|---|---|
| 2⅝ | 11/16 | 1.941 | Yes, 15 mil | 0.19 | 0.055 |

These data demonstrate that under substantially identical conditions, the inclusion of the reinforcing mat substantially reduces low temperature distortion with no adverse effect upon the heat transfer coefficient of the composite.

It will be evident from the foregoing that the composite of this invention possesses unexpected properties not evident from an inspection of the composites of the prior art.

It will be evident that various modifications can be made to this invention. Such, however, are considered to be within the scope of the invention.

I claim:

1. In a composite panel comprising a cellular core and an upper layer and a lower layer of organic fibers on the major surfaces of said core, said panel having upper outer and lower outer inorganic layers in contact with said upper and said lower layers of organic fibers, the improvement comprising an interposed layer of inorganic fibers in contact with said cellular core and said upper layer of organic fibers.

2. The panel of claim 1 in which said cellular core comprises a urethane foam, said upper layer and lower layer of organic fibers comprise rayon fibers, said upper outer and said lower outer inorganic layers comprise glass and said interposed layer comprises glass.

3. The panel of claim 2 in which said cellular core penetrates said interposed layer, said layers of organic fibers and said upper and lower outer glass layers to bond said layers, said core remaining substantially discrete.

4. The panel of claim 3 in which said lower outer inorganic layer comprises a glass fiber board having a thickness within the range of about ½ inch to about 2½ inches and an apparent density within the range of about 6 to about 12 pounds per cubic foot.

5. The panel of claim 4 in which said cellular layer has a thickness within the range of from about ½ inch to about 4 inches.

6. The panel of claim 5 in which said organic fibers comprise a non-woven rayon web.

7. The panel of claim 6 in which said interposed layer of glass fibers has a thickness within the range of from about 10 to about 30 mils.

8. The panel of claim 7 in which the upper outer glass layer has a thickness within the range of from about 10 to about 14 mils.

9. The panel of claim 8 having a distortion of about 0.19 inches after two hours at −6.7° C.

10. The panel of claim 9 having a total thickness of about 2⅝ inches, a lower outer glass layer of about 11/16 inch thickness and a foam layer of about 1.9 inches thickness.

* * * * *